Patented June 16, 1925.

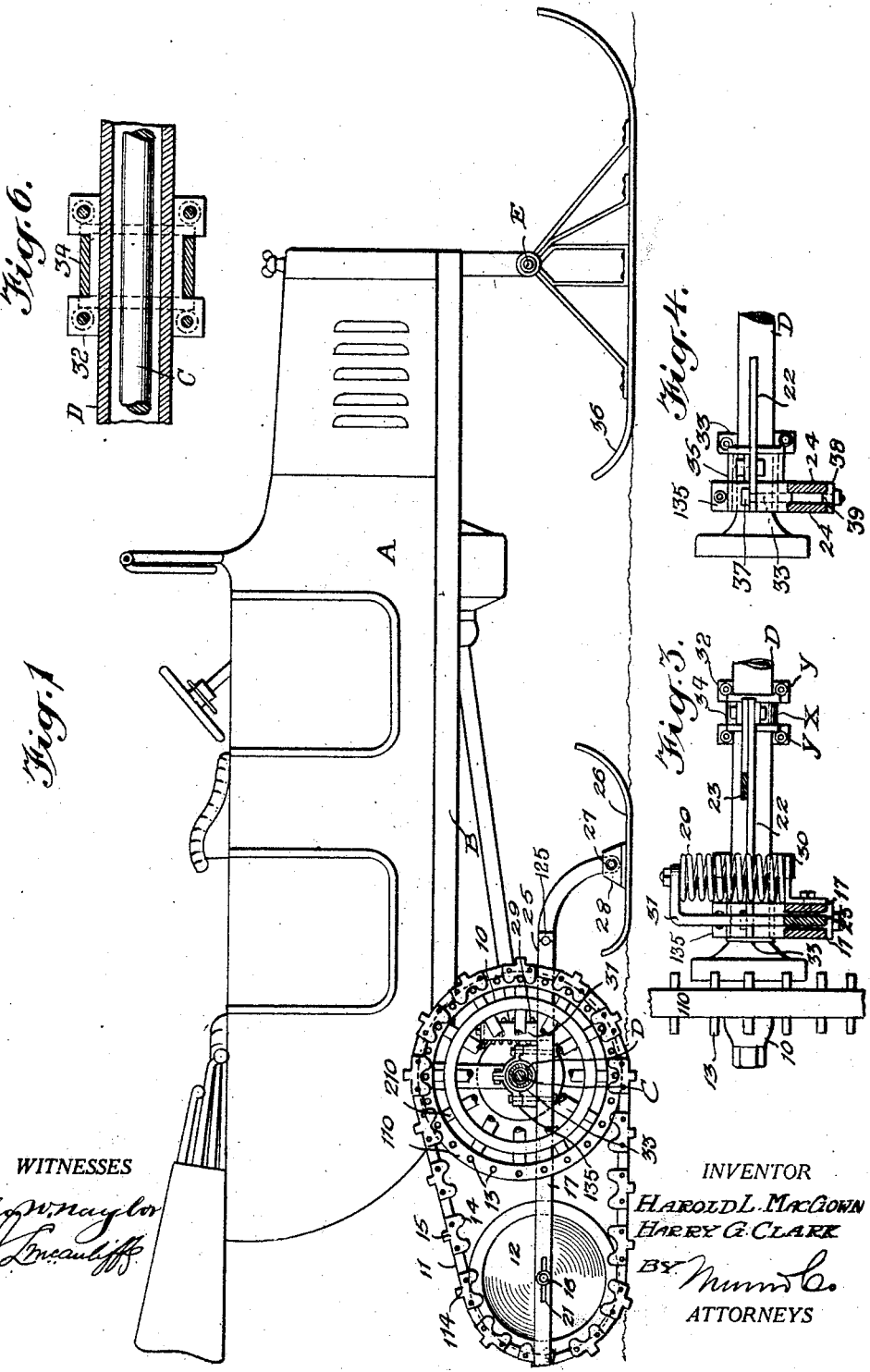

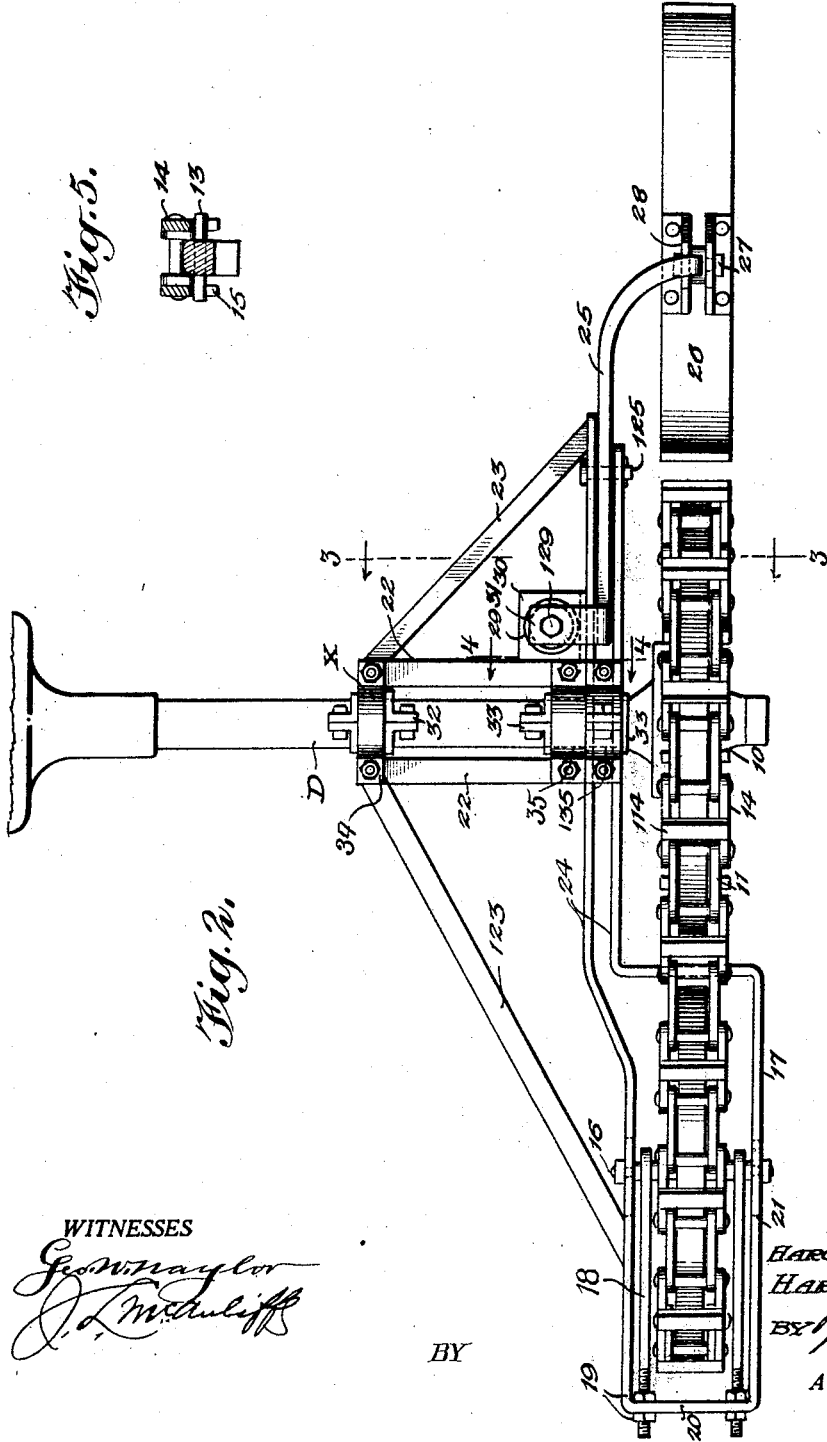

1,542,625

UNITED STATES PATENT OFFICE.

HAROLD L. MacGOWN AND HARRY G. CLARK, OF GORHAM, NEW HAMPSHIRE.

SLED ATTACHMENT FOR AUTOMOBILES.

Application filed April 5, 1923. Serial No. 630,105.

*To all whom it may concern:*

Be it known that we, HAROLD L. MAC-GOWN and HARRY G. CLARK, citizens of the United States of America, and residents of Gorham, in the county of Coos and State of New Hampshire, have invented a new and Improved Sled Attachment for Automobiles, of which the following is a description.

Our invention relates to a sled attachment to be applied to an automobile in association with the rear wheels and the invention has for its general object to provide an attachment effective for use in propelling the automobile over snow or ice and possessing at the same time the attributes making for the maximum practicability.

More specifically, the invention has for its object to provide sled units each comprising a traction chain adapted to run over a rear wheel and over a follower wheel provided for the purpose, as well as a runner element arranged to be disposed in front of the automobile wheel and to embody in the attachment a frame rockable on the axle housing that the runner and follower wheel may accommodate themselves to inequalities of the road surface and in a manner that each bears its part of the load.

A further object is to embody in the sled unit spring means to lend the desired flexibility to the attachment.

The manner and means whereby the above and other objects are attained will clearly appear as the description proceeds.

Reference is to be had to the accompanying drawings forming a part of this specification, it being understood that the drawings are merely illustrative of one example of the invention.

Figure 1 is a side elevation of an automobile equipped with our invention, part of the rear axle and its housing in section;

Figure 2 is a plan view of one of the sled units showing the same applied to the housing of the rear axle illustrated in part;

Figure 3 is a transverse vertical section in a plane indicated by the line 3—3, Figure 2;

Figure 4 is a detail in section on the line 4—4, Figure 2;

Figure 5 is a transverse section through the tractor chain and the rim of the automobile wheel;

Figure 6 is a detail in longitudinal section showing the rockable mounting of a sled and drive unit on the axle housing.

In the illustrated example of our invention an automobile A is conventionally shown, B, indicating the chassis frame; C, the rear axle; D, the housing of said axle; and E the front axle.

In accordance with our invention each rear wheel 10 constitutes a drive element for which purpose we provide an attachment for the automobile wheel consisting of a rim 110 concentric with and spaced from the rim of the wheel 10 by an annular series of spacing blocks 210. Over the wheel 10 runs a traction belt 11, said belt running also over a follower idler wheel 12 provided to be positioned in the rear of and tracking the automobile wheel 10. Any suitable coacting elements may be provided on the wheel 10 and on chain 11 to actuate the latter. We have shown for the purpose lateral pins 13 on rim 110 of the wheel 10 and links 14 incorporated in the chain provided with recesses 15 for engagement with pins 13. Said links 14 being disposed at opposite sides of the chain to take the pins at each side of the wheel, the side members of the links 14 are connected by cross bars 114. For tightening the chain 11 the axle 16 of the follower wheel 12 works in slots 21 of a frame 17 comprising side bars disposed at the outside and inner side of said wheel 12. Tension rods 18 extend from the axle 16 and through the cross bar 20 of the frame 17 in the rear of wheel 12, said rods 18 being adjustable by reason of lock nuts 19 bearing against the cross bar 20. As shown clearly in Figure 1 the idler wheel 12 at the bottom is disposed at an elevation so that the chain 11 running about said idler will travel at the under side of the idler in the same plane with the sled runner 26.

The side bars of the frame 17 are brought adjacent to each other at the inner side of the rear wheel 10 to provide longitudinal members 24 spaced apart. Extending laterally inward from the frame members 24 are frame members 22 disposed lengthwise of the axle housing D. Oblique braces 23, 123 extend from the inner frame member 24 to the inner ends of the frame members 22. Between the forward ends of the spaced frame members 24 is a frame member 25 secured to the members 24 by a transverse pin or bolt 125. Said frame member 25 is directed downwardly and laterally outward and has secured at its forward end a runner 26 disposed in front of and in alinement with the rear wheel 10. The runner 26 is shown as having knee brackets 28 rising therefrom and bolt 27 passes through said brackets and through the forward terminal of frame member 25.

To give flexibility to the unit associated with each rear wheel 10 a vertical compression spring 29 is disposed at the inner side of the frame members 24 and seats on a lateral bracket 30 on one of said members 24. At the rear end of the frame member 25 is an integral angle member 31 extending over the top of the spring 29 and secured to the said bracket 30 by a bolt 129 passing downwardly through the spring 29.

In order to rockably mount the unit on the axle housing D we provide in the illustrated example a split clamp sleeve 32, adapted to bind upon the axle housing D adjacent the inner end of the frame members 22 and provide a similar split clamp 33 for binding on said housing D adjacent the outer end of the frame members 22.

Rockable on the clamp sleeves 32, 33 are split clamps 34, 35 rigid with the frame members 22, brace 23 and frame member 25, whereby the said frame members and brace, together with the follower wheel 12 and runner 26 may have rocking movement about the axis of the housing D whereby to permit the follower wheel 12 and runner 26 to accommodate themselves to irregularities of ground surface to insure each its portion of the load. The clamp sleeve 33 is elongated and in addition to the clamp 35 turning thereon the frame portion including the members 22 and 24 have rigid therewith a second clamp-like device 135 turning on said sleeve 33.

The disposition of the spring 29 and its relation to the frame members 24, 25 gives flexibility and resiliency to the unit as a whole and permits a certain individual flexibility to the frame member 25 and runner 26.

In employing the described drive and traction units in association with the rear wheels of the automobile we employ also sled runners 36 mounted on the front axle E at each end.

In Figure 4 the numeral 37 indicates a bolt passing through a frame member 22 downwardly between the frame members 24, said bolt 37 having a washer 38 thereon formed with a spacing member 39 entering between the members 24.

We would state in conclusion that while the illustrated example constitutes a practical embodiment of our invention, we do not limit ourselves strictly to the exact details herein illustrated, since, manifestly, the same can be considerably varied without departure from the spirit of the invention as defined in the appended claims.

Having thus described our invention, we claim:

1. An attachment for automobiles consisting of a unit comprising a frame, means to mount the frame to rock in a vertical plane, a follower idler wheel mounted in said frame at the rear end adapted to track a drive wheel of an automobile, a traction chain adapted to run about said follower wheel and about the drive wheel of the automobile, means to actuate said chain from the automobile wheel, and a sled runner on said frame at the front end and pivoted thereon to rock vertically, said idler at the bottom thereof being at an elevation to position said traction chain to run on the ground substantially in alinement with said runner.

2. A sled attachment for automobiles consisting of a unit comprising a longitudinal frame, a sled runner at the front of said frame, a follower wheel at the rear of said frame adapted to track the rear wheel of an automobile, a traction chain adapted to be run about said follower wheel and about said rear automobile wheel, means to drive the chain from said automobile wheel, an extension on said frame disposed laterally inward to lie along the axle housing and in rigid relation to said frame, and means on said frame at said lateral extension to rockably mount the frame on the axle housing.

3. An attachment for automobiles to be employed in association with a rear wheel thereof, said attachment consisting of frame bars forming the rear portion of the frame, a wheel mounted on and disposed between said frame bars, said bars in front of said second-mentioned wheel being disposed in a plane at a side of said second-mentioned wheel, a drive chain adapted to run over said second-mentioned wheel and over the drive wheel of an automobile, means to actuate the chain from the automobile wheel, means to rockably mount said frame bars on the axle housing of the automobile, a frame element on said side bars at the front end thereof, and a sled runner on said frame element at the front end and disposed in alinement with the wheel on said frame and adapted to be disposed in front of the automobile wheel.

4. A sled attachment for automobiles, comprising longitudinal frame bars, a wheel mounted between said frame bars adjacent the rear ends adapted to be positioned as a follower for an automobile drive wheel, a chain adapted to run over said follower wheel and over the automobile wheel, means to actuate said chain from the automobile wheel, a frame element pivotally mounted between its ends on said first-mentioned bars to have movement in a vertical plane, a sled runner on said frame element, means on the first-mentioned frame bars to rockably mount the same on the axle housing of an automobile, compression springs at a side of said frame bar, and members on said frame bars and on said frame element respectively against which the ends of said spring abuts.

HAROLD L. MacGOWN.
HARRY G. CLARK.